Sept. 12, 1967 S. JURA ETAL 3,341,141

TAPE TRANSPORT MECHANISM

Filed Dec. 29, 1965 3 Sheets-Sheet 1

INVENTORS

Stanislav Jura, Miloslav Martinek

BY

Richard Lowe Atty

Sept. 12, 1967 S. JURA ET AL 3,341,141

TAPE TRANSPORT MECHANISM

Filed Dec. 29, 1965 3 Sheets-Sheet 2

INVENTORS
Stanislav Jura, Miloslav Martinek
BY
Richard Lowe Ag't

TAPE TRANSPORT MECHANISM

INVENTORS
Stanislav Jura, Miloslav Martinek
BY
Richard Low
Agt

United States Patent Office
3,341,141
Patented Sept. 12, 1967

3,341,141

TAPE TRANSPORT MECHANISM

Stanislav Jura and Miloslav Martínek, Prague, Czechoslovakia, assignors to Výzkumný ústav matematických strojů, Prague, Czechoslovakia Filed Dec. 29, 1965, Ser. No. 517,256
Claims priority, application Czechoslovakia, Jan. 8, 1965, 147/65
6 Claims. (Cl. 242—55.12)

ABSTRACT OF THE DISCLOSURE

A tape recorder having a tape storage unit interposed between a tape reel and a driven capstan, the unit having tape guiding pulleys mounted on the recorder casing and on a swinging arm which actuates a single stationary switch during its movement. The switch is arranged in circuit with a drive motor and an electromagnetic brake for the reel to stop the reel when the arm swings clockwise past the switch during forward tape movement, and to start the reel when the arm swings counterclockwise. During reverse tape movement, the arm movements have the opposite effect.

This invention relates to data processing machinery, and particularly to a mechanism for transporting tape and similar information storage devices toward and away from reading and recording devices.

The tapes with the transport of which this invention is concerned include, but are not limited to magnetic tapes and perforated tapes, and the invention is not directly concerned with the methods employed for storing information in the tapes and for reading the tapes. While the invention will be described hereinafter with reference to a known reading and recording head assembly adapted to stop and start tape movement in the immediate area of the recording and/or reading heads, other applications for the tape transport mechanism of the invention will readily suggest themselves.

It is conventional to release coiled tape by unwinding from a first reel, to move it past the head assembly, and then to wind it on a second reel. If the head assembly causes stopping of the head for reading or recording, a reserve amount of tape must be stored in a suitable device interposed between the first reel and the head assembly so that the inertia of the reel need not be overcome in starting tape movement.

If the tape is to be moved past the head assembly in both directions, the transport mechanism may include two identical units, each consisting of a reel equipped with its own motor and brake, and an associated storage device to which tape is released from the reel during unwinding, and from which the reel withdraws tape when winding. Tape is taken from the storage device by the head assembly when the associated wheel unwinds, and is returned to the storage device by the head assembly during winding of the reel. Since the head assembly and the reel cause the tape to move at different respective speeds, the storage device is equipped with a sensing arrangement which stops and starts the reel as needed to maintain a desired tape reserve.

As will be described in greater detail hereinafter, a relatively great amount of tape must be held in reserve in each of the two units of a conventional tape transport mechanism of the type with which this invention is particularly concerned. The tape not only requires space which may be in short supply, but the amount of tape in reserve affects the maximum operating speed available. Movement through an extended storage device may also unfavorably affect the useful life of the tape. An important object of this invention, therefore, is the provision of a tape transport unit of the type described which requires but a minimum of tape reserve for its operation.

Another object of the invention is the reduction in the number of mechanical moving parts in a tape transport unit. More specifically, the invention aims at reducing the number of sensing devices required for maintaining the tape reserve in a storage device at or near a constant value during operation of the transport unit in which the tape moves in both directions.

With these and other objects in view, as will hereinafter become apparent, the individual tape transporting unit of the invention may include the usual tape storage device for maintaining a suitable reserve of tape and a reel adapted to carry coiled tape and rotatable in two directions respectively for releasing tape to the associated storage device and for withdrawing tape therefrom. The reserve amount of tape in the storage device is sensed, and a first signal is generated when the reserve amount increases beyond a predetermined amount. A second signal is generated when the reserve is reduced to less than the predetermined amount.

The reel is equipped with an electrically operated drive and with an electrically operated brake. The principal feature of this invention is a switch arrangement connected to a source of current, the sensing device for the amount of tape in reserve storage, the reel drive, and the reel brake, and capable of moving between two positions, the arrangement being such that the brake is actuated and the drive is deenergized in response to the afore-mentioned first signal, and the brake is released and the drive is connected to the current source for rotating the reel in one direction in response to the second signal when the switch is in one of its positions. When the switch is in its other position, the brake is released and the drive is connected to the current source for rotating the reel in the other direction in response to the first signal, and the brake is actuated and the drive is deenergized in response to the second signal.

The exact nature of this invention as well as other objects and advantages thereof will be readily apparent from consideration of the following specification relating to the annexed drawing in which.

Figure 1:
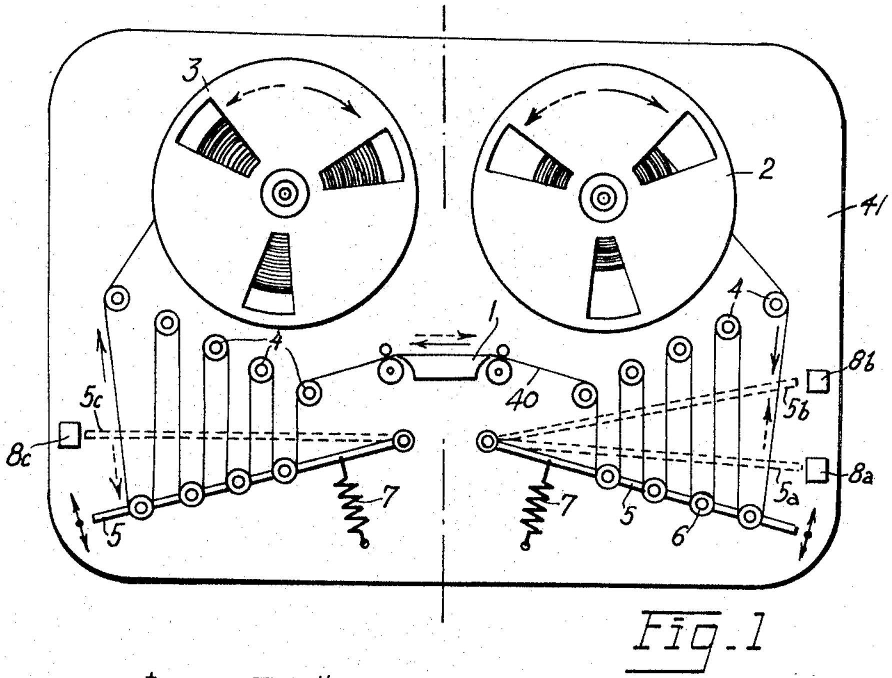
FIG. 1 shows a tape recording and reading apparatus in plan view, the apparatus being equipped with one known tape transporting unit and with one tape transporting unit of the invention.

Referring now to the drawing in detail, and initially to FIG. 1, there is shown a reading and recording apparatus for a magnetic tape 40 in which the tape is moved past a head assembly 1 between two reels 2, 3. Each reel with its associated motor and brake, not seen in FIG. 1, constitutes an independent tape transporting unit. The unit associated with the reel 2 is of a known type, that associated with the reel 3 is arranged according to the invention.

Each unit is equipped with a storage device for storing a reserve supply of tape. Each storage device includes five guide pulleys 4 mounted for rotation about fixed axes on the housing 41 which supports the apparatus and encloses those elements thereof which are not visible in FIG. 1. An arm 5 one end of which is pivotally fastened to the housing 41 carries four additional guide pulleys 6. The respective portions of the tape 41 between the head assembly 1 and the reels 2, 3 are trained over the fixed pulleys 4 and movable pulleys 6, and are tensioned by springs 7 interposed between the housing 41 and the arms 5. Two snap switches 8*a*, 8*b* are arranged along the path of pivoting movement of the arm 5 associated with the reel 2 for generating electrical signals when the arm passes through the positions 5*a*, 5*b* respectively shown in broken lines. Another snap switch 8*c* is similarly associated with a position 5*c* of the other arm 5. It will be understood that the non-illustrated actuating elements of the switches project into the paths of the arms 5.

Figure 2:
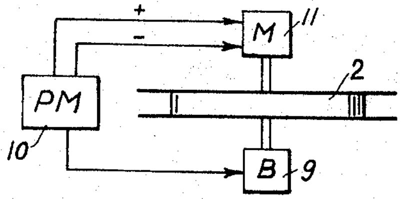
FIG. 2 is a view which diagrammatically illustrates essential features of the known unit of the apparatus of FIG. 1.

The general arrangement of the known tape transporting unit associated with the reel 2 is diagrammatically illustrated in FIG. 2. A motor 11 and an electromagnetic brake 9 are connected with the shaft of the reel 2 and are controlled by a position monitor 10 constituted by the two switches 8*a*, 8*b* and a suitable source of current, not itself shown.

When the apparatus shown in FIG. 1 operates to unwind tape 40 from reel 2 and to wind the same on reel 3 in the direction of the fully drawn arrows, a capstan in the head assembly 1, not shown in detail, moves the tape 40 through the assembly 1 at a speed somewhat smaller than the circumferential speed of the reel 2, and the excess of tape is stored between the pulleys 4, 6 associated with the reel, the corresponding arm 5 thereby being pivoted clockwise from its normal position between those indicated at 5*a* and 5*b* by the spring 7.

When the apparatus shown in FIG. 1 operates initially to transport tape 40 in the direction of the arrows shown in fully drawn lines, and the reel 2 stands still, the arm 5 of the storage device associated with the reel 2 is pivoted counterclockwise as tape is withdrawn from the stored reserve by a capstan in the head assembly 1, not shown in detail. When the arm passes the position 5*b*, it actuates the switch 8*b* which causes the brake 9 to be released and the motor 11 to be started in a direction to unwind tape from the reel 2, the circumferential speed of the reel 2 being selected greater than the speed of the non-illustrated capstan in the assembly 1 so that the tape reserve between the pulleys 4, 6 is increased until the arm 5 again passes the position 5*b*, and actuates the switch 8*b*, whereby the motor 11 is stopped, and the brake 9 is applied. Stopping and starting of the motor 11 and corresponding application and release of the brake 9 alternate during unwinding of tape 40 from the reel 2. The arm 5 oscillates about the position 5*b*.

When tape 40 is transported in the direction of the arrows shown in broken lines toward the reel 2, and the associated arm 5 is initially in the fully drawn position, the capstan of the head assembly 1 feeds tape into the storage device, but the motor 11 is energized to turn the reel 2 counterclockwise so that the tape reserve is reduced until the arm passes the position 5*a* and actuates the switch 8*a*, thereby stopping the motor 11 and applying the brake 9. As more tape 40 is fed to the storage device, the arm moves clockwise, and the cycle is repeated. The arm 5 oscillates about the position 5*a*.

While it will be understood that an apparatus of the type described normally has two identical tape transporting units, the known unit associated with the reel 2 has been combined with a unit of the invention associated with the reel 3 for the sake of simpler illustration. The arrangement of the latter unit is shown diagrammatically in FIG. 3. The signal of the snap switch 8*c* which constitutes the position monitor 10' is fed to a switching arrangement 12 controlled by an external signal A, and connected to a motor 11 and electromagnetic brake 9 connected to the shaft of the reel 3 in a conventional manner.

As will presently be described in more detail, the switching arrangement 12 is capable of at least two positions, and is switched between these positions by the signal A, also presently to be explained. When the tape 40 is moved in the direction of the fully drawn arrows in FIG. 1, the switch 8*c*, operating through the switching arrangement 12, stops the motor 11 and applies the brake 9 when the arm 5 passes the switch in a clockwise direction, and starts the motor 11 and releases the brake 9 when the arm 5 passes the switch 8*c* in a counterclockwise direction. When the switching arrangement 12 is set by the signal A for tape movement in the direction of the arrows shown in broken lines, the motor 11 is started by clockwise arm movement and stopped by counterclockwise arm movement past the switch 8*c*, the brake 9 being operated accordingly.

The unit associated with the reel 3 thus requires only one switch as a position monitor for the tape storage device, and the arm 5 oscillates only about a single position 5*c* during tape movement in either direction. While this has not been shown in the drawing, it is also evident that the tape reserve which must be stored for the reel 3 is substantially smaller than that required for the reel 2, the difference under otherwise comparable conditions corresponding to the amount of tape let out or taken up during arm movement between the positions 5*a* and 5*b*. In practice, the difference has been found to amount to approximately 50%.

Figure 3:
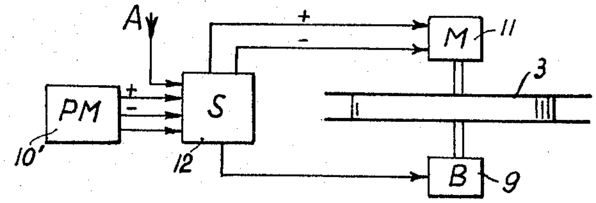
FIG. 3 is a view which similarly shows the corresponding features of the other unit of the apparatus of FIG. 1.
Figure 4:
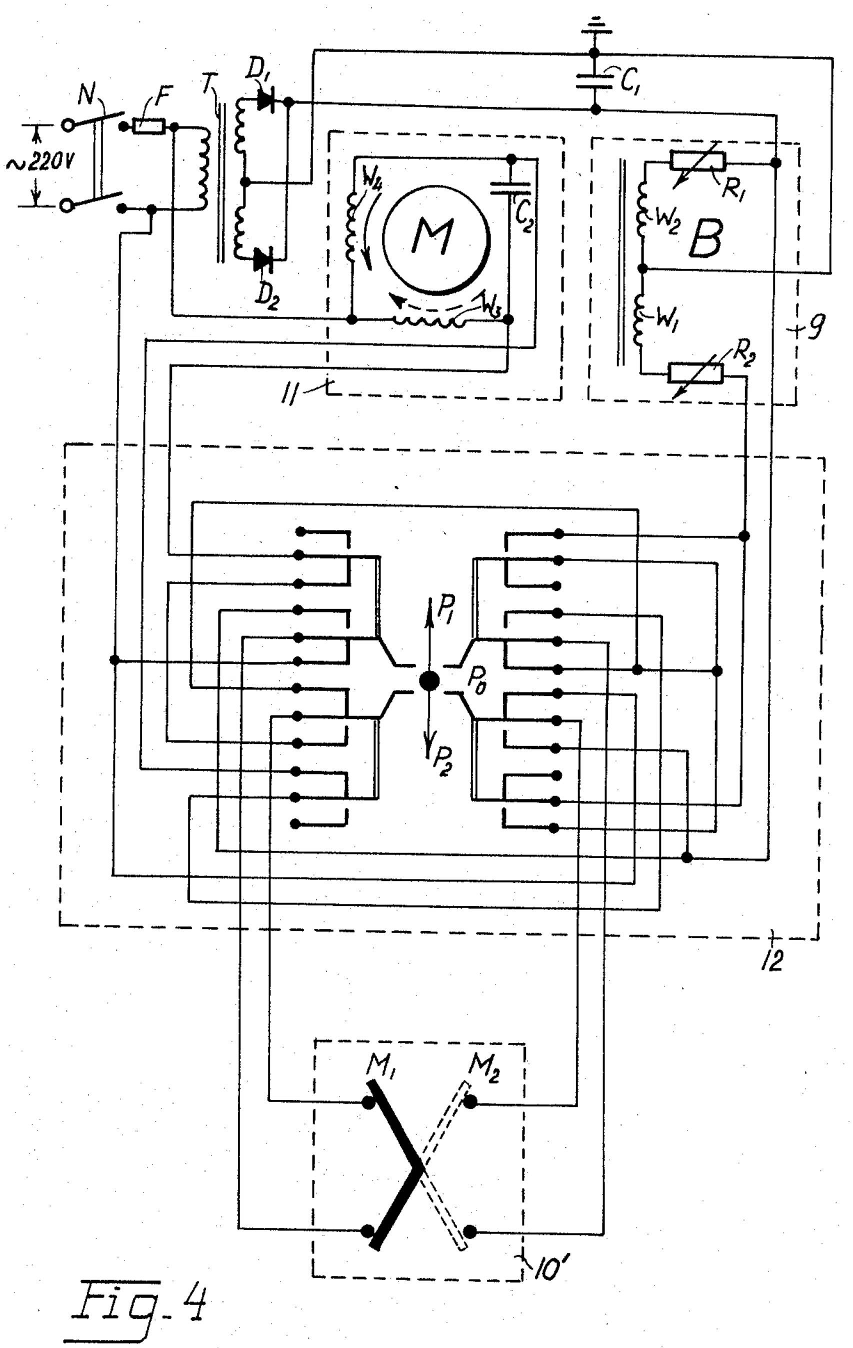
FIG. 4 is the circuit diagram of the unit of FIG. 3.

The circuit diagram of a tape transporting unit of the invention adapted to operate as described with reference to FIG. 3 is shown in FIG. 4.

The electromagnetic brake 9 has an operating winding $W_1$ and a compensating winding $W_2$ for demagnetizing the core of the brake when the brake is released. The power supply for the brake 9, whose mechanical parts are conventional in this art and have not been shown in detail, is provided from a 220 volt A.C. line through a main switch N, a fuse F, a transformer T and two diodes $D_1$, $D_2$ in the secondary circuit of the transformer T which also is provided with a filter condenser $C_1$. Adjustable resistors $R_1$, $R_2$ are arranged in respective power leads of the windings $W_1$, $W_2$. The winding $W_2$ is energized whenever the main switch N is closed. The circuit of the winding $W_1$ is closed and opened by contacts in the switching arrangement 12.

The motor 11 is reversible, having two windings $W_3$ and $W_4$, and is provided with a starting condenser $C_2$. One power line of each winding passes through the switching arrangement 12 and the main switch N to one pole of the A.C. line, the other terminals of the windings $W_3$, $W_4$ are jointly and permanently connected to the main switch N.

The position monitor 10', identical with the switch 8*c*, is a snap switch which moves between two positions $M_1$, $M_2$ in response to passage of the arm 5 in FIG. 1. The switching arrangement 12 consists of a manually operated multi-pole double-throw switch having eight movable contacts and eight pairs of fixed contacts respectively associated with the movable contacts. In the illustrated position $P_0$, the switch 12 interrupts the power supply circuits of the brake winding $W_1$ and of the two motor windings $W_3$, $W_4$, regardless of the position of the snap switch 10'.

When the switch 12 is moved in the direction of the arrow $P_1$, four of its movable contacts are switched over to close the power supply circuit of the winding $W_1$ in the position $M_1$ of the switch 10, and to close the circuit of the winding $W_4$ for tape movement in the direction of the arrows drawn in full lines in FIG. 1 when the switch 10 is in position $M_2$.

When the switch 12 is then moved into the position $P_2$, the previously displaced four movable contacts return to the illustrated position, and the other four are displaced in such a manner that the motor winding $W_3$ is energized when the switch 10 is in the position $M_1$, and the magnet winding $W_1$ is energized when the switch 10 is in the position $M_2$. The movement of the arm 5 which energizes the brake and deenergizes the motor in the position $P_1$ of the switch 12 thus energizes the motor and deenergizes the brake when the switch 12 is in position $P_2$. The signal A indicated in FIG. 3 is the manual movement of the switch 12 between its positions which also causes reversal of the direction of motor movement.

Figure 5:
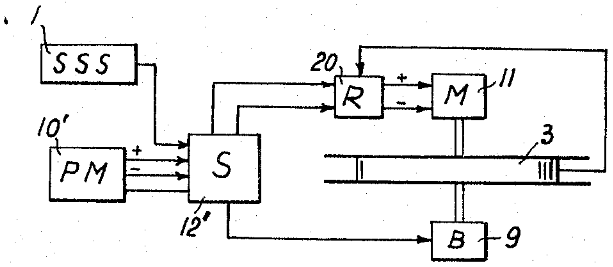
FIG. 5 is a view which shows a modified unit of the invention in the manner of FIG. 3.

It is evident that the switching arrangement 12 may be actuated by an electromagnet or in any other manner in response to an electrical signal derived from the operation of the computer or other data processing machine with which the illustrated tape reading and recording apparatus is associated. FIG. 5 diagrammatically illustrates such a modified device of the invention in which the signal for a switching arrangement 12' is furnished by the head assembly 1. It may either be generated in the assembly or fed to the assembly 1 and the switching arrangement 12' from a common source not itself relevant to this invention. FIG. 5 also shows a speed control 20 interposed between the motor 11 and the switching arrangement 12' and responsive to the diameter of the coil of tape 40 on the reel 3.

Figure 6:
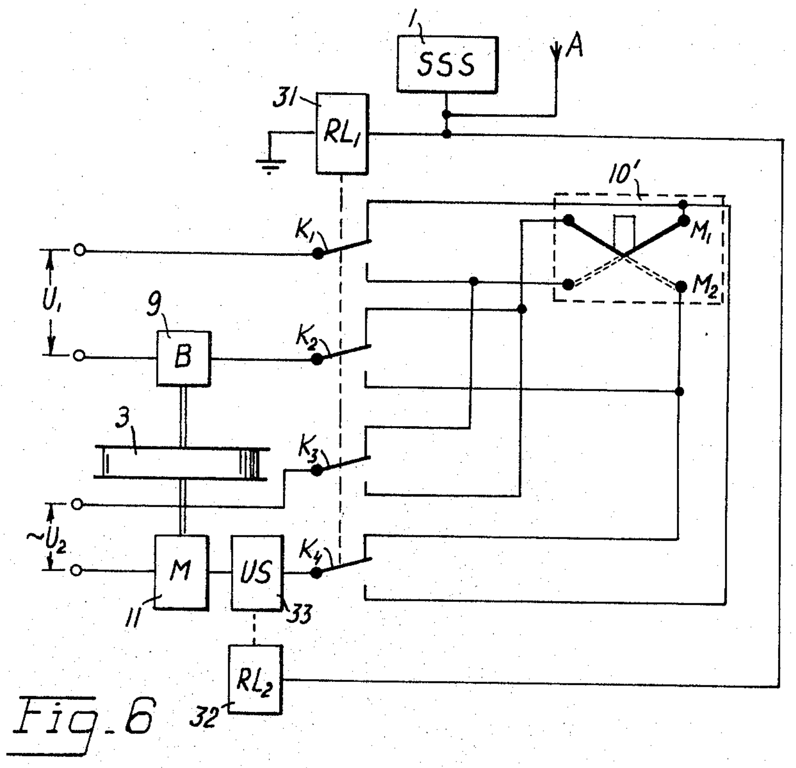
FIG. 6 is the circuit diagram of the unit of FIG. 5.

The circuit diagram of the switching arrangement 12' and of associated elements is shown in FIG. 6. The switching arrangement is constituted by two relays 31, 32. The relay 31 has four SPDT contacts $K_1$ to $K_4$. The contacts $K_1$ and $K_2$ connect a D.C. supply line $U_1$ to the brake through the snap switch 10 when the latter is in the position $M_1$ and the relay 31 is in the illustrated deenergized position. The contacts $K_3$, $K_4$ similarly connect the motor 11 to an A.C. source $U_2$ when the switch 10 is in the position $M_2$.

A set of contacts 33 of the relay 32 is interposed between the two windings of the motor 11 and the contact $K_4$. When the relays 31, 32 are energized by a signal received from the head assembly 1, the contacts $K_1$, $K_2$ are shifted to energize the brake 9 when the switch 10 is in the position $M_2$, and the contacts $K_3$, $K_4$ energize the motor 11 when the switch 10 is in the position $M_1$. The contacts 33 of the relay 32 are simultaneously switched to reverse the direction of rotation of the motor 11 in a manner obvious from FIG. 4.

An additional power source other than the head assembly 1 may be resorted to for providing an energizing signal A to the relays 31, 32, as diagrammatically indicated in FIG. 6.

The head assembly 1 is preferably provided with a non-illustrated switch responsive to the movement of its capstan for providing an energizing signal for the relays 31, 32, when the capstan rotates in one direction, and to deenergize the relays when the capstan stands still or rotates in the other direction.

Figures 7, 8:
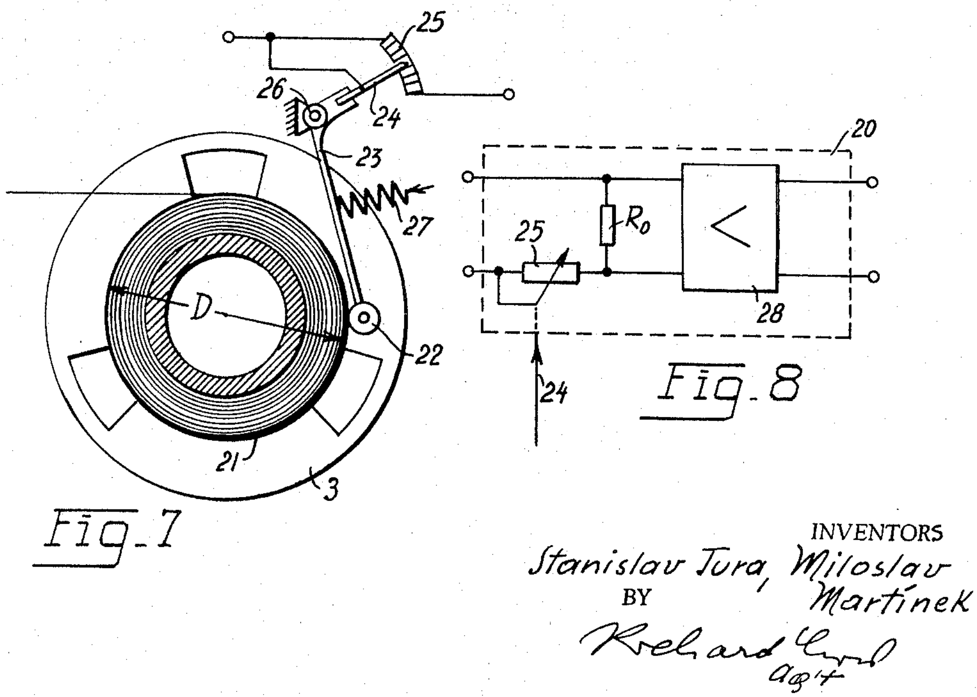
FIGS. 7 and 8 are views which respectively show mechanical features and the circuit diagram of a detail of the unit of FIG. 5.

The speed control device 20 is shown in more detail in FIGS. 7 and 8. It is not specifically illustrated in FIG. 6, and will be understood to be a portion of the A.C. source $U_2$.

As shown in FIG. 7, a coil 21 of magnetic tape having an outer diameter D is wound on the reel 3. A roller 22 mounted on a bellcrank lever 23 is held in engagement with the outermost tape layer of the coil 21 by a compression spring 27. The lever 23 is mounted on the housing 41 by a pivot 26 and carries the movable contact 24 of a potentiometer 25.

Referring now to FIG. 8, it is seen that the potentiometer 25 is arranged together with a resistor $R_0$ as a voltage divider in the input of an amplifier 28 in such a manner that the input signal of the amplifier is at a minimum when the diameter D of the coil 21 is at its maximum. The output of the amplifier 28 is fed to the motor 11 to operate the same at a speed which is approximately inversely proportional to the diameter of the coil 21, thereby maintaining an approximately uniform linear speed of the tape 40 when drawn by the reel 3 regardless of the diameter of the coil of tape 21 on the reel.

The operation of the tape storage device 4, 5, 6 is greatly improved by the use of the illustrated speed control device 20.

It will be appreciated that the intermittently operated motor 11 may be replaced in the several embodiments illustrated and described herein by a continuously operated motor and a drive clutch or drive clutches in the manner disclosed in my copending application Ser. No. 455,117, now Patent No. 3,315,907.

Obviously, many other modifications and variations of the present invention are possible in the light of the above teachings. It is therefore to be understood that, within the scope of the appended claims, the invention may be practiced otherwise than as specifically described.

We claim:

1. A tape transporting unit comprising, in combination:

(a) tape storage means for maintaining a reserve of tape;

(b) reel means adapted to carry coiled tape and rotatable in two directions respectively for releasing tape to said storage means and for withdrawing tape therefrom;

(c) sensing means for sensing said reserve amount and for generating a first signal when said amount increases beyond a predetermined amount, and for generating a second signal when said reserve amount is reduced to less than said predetermined amount;

(d) electrically operated drive means for rotating said reel means in said two directions;

(e) electrically operated brake means for stopping rotation of said reel means;

(f) a source of electric current; and (g) switch means operatively connected to said source, said sensing means, said drive means, and said brake means, said switch means being movable between two positions for actuating said brake means and deenergizing said drive means in response to said first signal, and for releasing said brake means and connecting said drive means to said source for rotation of said reel means by said drive means in one of said directions in response to said second signal when said switch means is in one of said positions thereof, and for releasing said brake means and connecting said drive means to said source for rotation of said reel means by said drive means in the other direction in response to said first signal, and for actuating said brake means and deenergizing said drive means in response to said second signal when said switch means is in the other position thereof, (1) said switch means being connected in circuit with said source, said sensing means, and said brake means; and (2) said drive means including a reversible electric motor having two windings respectively adapted to be energized for rotation of said motor in opposite directions, said switch means being interposed in circuit between said source and each of said windings.

2. A unit as set forth in claim 1, further comprising a housing, said storage means including a first pulley mounted on said housing in a fixed position, and a second pulley mounted on said housing for movement toward and away from said first pulley, said sensing means being responsive to movement of said second pulley toward and away from said first pulley past a predetermined position for generating said signals.

3. A unit as set forth in claim 2, wherein said sensing means is a snap switch.

4. A unit as set forth in claim 1, further comprising moving means for moving said switch means between said positions thereof.

5. A unit as set forth in claim 1, further comprising moving means responsive to an electrical signal for moving said switch means between said positions thereof.

6. A unit as set forth in claim 1, further comprising speed control means responsive to the amount of tape coiled on said reel means and operatively connected to said drive means for varying the rotary speed of said reel means when rotated by said drive means.

References Cited

UNITED STATES PATENTS

| | | | |
|---|---|---|---|
| 2,921,753 | 1/1960 | Lahti et al. | 242—55.12 |
| 3,115,314 | 12/1963 | Manley et al. | 242—55.12 |

LEONARD D. CHRISTIAN, *Primary Examiner.*